US006397692B1

United States Patent
Carriere

(10) Patent No.: US 6,397,692 B1
(45) Date of Patent: Jun. 4, 2002

(54) ELECTRO-MECHANICAL AUTOMATIC TRANSMISSION FOR FRONT WHEEL DRIVE

(75) Inventor: Donald L Carriere, Livonia, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/506,965

(22) Filed: Feb. 18, 2000

(51) Int. Cl.$^7$ ................................................ F16H 3/08
(52) U.S. Cl. ....................................................... 74/331
(58) Field of Search ............................ 74/331; 192/4 A

(56) References Cited

U.S. PATENT DOCUMENTS

| | | | |
|---|---|---|---|
| 3,238,726 A | 3/1966 | Jandasek | |
| 4,461,188 A | * 7/1984 | Fisher | ......................... 74/330 |
| 4,549,443 A | 10/1985 | White | |
| 4,561,322 A | 12/1985 | Hausinger | |
| 4,708,026 A | * 11/1987 | Ikemoto | ................... 74/331 X |
| 4,714,147 A | 12/1987 | Szodfridt et al. | |
| 4,721,002 A | 1/1988 | Horii | |
| 4,771,648 A | 9/1988 | Bardoll | |
| 5,009,118 A | 4/1991 | Raszkowski et al. | |
| 5,018,404 A | 5/1991 | Müller | |
| 5,081,878 A | * 1/1992 | Stasiuk | ...................... 74/331 X |
| 5,125,282 A | 6/1992 | Bender et al. | |
| 5,259,260 A | 11/1993 | Schneider | |
| 5,267,635 A | 12/1993 | Peterson et al. | |
| 5,363,712 A | 11/1994 | Müller | |
| 5,365,800 A | 11/1994 | Müller | |
| 5,383,375 A | 1/1995 | Ogawa et al. | |
| 5,392,665 A | 2/1995 | Müller | |
| 5,465,630 A | * 11/1995 | Iwamoto | ...................... 74/331 |
| 5,474,505 A | 12/1995 | Seidel et al. | |
| 5,613,401 A | 3/1997 | Maurizio | |
| 5,640,882 A | 6/1997 | Mueller | |
| 5,704,247 A | * 1/1998 | Ahluwalia et al. | ............. 74/331 |
| 5,711,186 A | 1/1998 | Lee | |
| 5,718,148 A | * 2/1998 | Bender | ...................... 74/331 X |
| 5,720,203 A | 2/1998 | Honda et al. | |
| 5,890,392 A | 4/1999 | Ludanek et al. | |
| 5,950,781 A | * 9/1999 | Adamis et al. | ............ 74/331 X |
| 6,021,880 A | * 2/2000 | Reed, Jr. et al. | ........... 74/335 X |
| 6,067,870 A | * 5/2000 | Fleishman et al. | ............. 74/331 |

FOREIGN PATENT DOCUMENTS

| | | | | |
|---|---|---|---|---|
| DE | 4104170 | * | 8/1992 | ................... 74/331 |
| GB | 2186333 | | 8/1987 | ................... 74/331 |
| JP | 274143 | * | 12/1986 | ................... 74/331 |
| JP | 274148 | * | 12/1986 | ................... 74/331 |
| JP | 404054353 | * | 2/1992 | ................... 74/331 |

* cited by examiner

Primary Examiner—Charles A. Marmor
Assistant Examiner—Roger Pang
(74) Attorney, Agent, or Firm—Mark P. Calcaterra

(57) ABSTRACT

An electro-mechanical automatic transmission is provided including a first input shaft and a second input shaft concentric with the first input shaft. A plurality of drive gears are rotatably mounted to the first input shaft. An idler gear is provided in meshing engagement with an input gear on said second input shaft. The idler gear drives a lay shaft which is also provided with a plurality of drive gears rotatably mounted thereon. The first input shaft and the lay shaft are provided with synchronizer devices for selectively engaging the drive gears thereto. A driven shaft is provided with a plurality of driven gears in meshing engagement with the drive gears. The electro-mechanical automatic transmission is provided with a pair of electro-mechanical clutch actuators for selectively disengaging dual clutches which transmit engine torque to the input shafts, as well as an electro-mechanical shift actuator system which operatively engage the synchronizer devices for selectively engaging the drive gears.

6 Claims, 3 Drawing Sheets

ELECTRO-MECHANICAL AUTOMATIC TRANSMISSION FOR FRONT WHEEL DRIVE

BACKGROUND OF THE INVENTION

FIELD OF THE INVENTION

The present invention relates to an automatic transmission, and more particularly, to an electro-mechanical automatic transmission having dual input shafts.

BACKGROUND AND SUMMARY OF THE INVENTION

There are presently two typical power transmissions in use on the conventional automobile. The first, and oldest, type of powertrain is the manually operated powertrain. These powertrains are typically characterized in that vehicles having manual transmissions include a clutch pedal to the left of a brake pedal and a gear shift lever which is usually mounted at the center of the vehicle just behind the dashboard. To operate the manual transmission, the driver must coordinate depression of the clutch and accelerator pedals with the position of the shift lever in order to select the desired gear. Proper operation of a manual transmission is well known to those skilled in the art, and will not be described further herein.

In a vehicle having an automatic transmission, no clutch pedal is necessary. The standard H configuration of the shift lever is replaced by a shift lever which typically moves back and forth. The driver need only select between park, reverse, neutral, drive, and one or two low gears. As is commonly known in the art, the shift lever is placed in one of several positions having the designator P, R, N, D, 2, and maybe 1 which corresponds to Park, Reverse, Neutral, Drive, and one or two low gears, respectively. Vehicle operation when the gear shift lever is placed in one of these positions is well known in the art. In particular, when in the drive mode, the transmission automatically selects between the available forward gears. As is well known, older systems typically included first, second and third gears, while newer systems include first through third gears as well as fourth and possibly a fifth and sixth overdrive gear. The overdrive gears provide an improved fuel economy at higher speeds.

As is well known, early transmissions were almost exclusively manually operated transmissions. With a steady development of automatic transmissions, drivers increasingly gravitated toward the easy operation of automatic transmissions. However, in the mid 1970s, rising concerns about present and future fossil fuel shortages resulted in an implementation of corporation average fuel economy regulations propagated in several countries. These fuel economy requirements necessitated the investigation of increasing the fuel economy of motor vehicles in order to meet government regulations. These government regulations prompted a gradual return to manual transmissions which are typically more efficient than automatic transmissions.

In the ensuing years, many mechanically operated vehicle systems were replaced or at least controlled by electronic control systems. These electronic control systems greatly increased the fuel efficiency of vehicle engines and enabled a gradual return to the convenience of automatic transmissions. In addition, electronic controls used with automatic transmissions, greatly improved the shift schedule and shift feel of automatic transmissions and also enabled implementation of fourth and fifth overdrive gears thereby increasing fuel economy. Thus, automatic transmissions have once again become increasingly popular.

Automatic and manual transmissions offer various competing advantages and disadvantages. As mentioned previously, a primary advantage of a manual transmission is improved fuel economy. Conversely, automatic transmissions first and foremost offer easy operation, so that the driver need not burden both hands, one for the steering wheel and one for the gear shifter, and both feet, one for the clutch and one for the accelerator and brake pedal, while driving. When operating a manual transmission, the driver has both one hand and one foot free. In addition, an automatic transmission provides extreme convenience in stop and go situations, as the driver need not worry about continuously shifting gears to adjust to the ever-changing speed of traffic.

The primary reason for the superior efficiency of the manual transmission over the automatic transmission lies in the basic operation of the automatic transmission. In most automatic transmissions, the output of the engine connects to the input of the transmission through a torque converter. Most torque converters have an input turbine that is connected to the output shaft of the engine and an input impeller that is connected to the input shaft of the transmission. Movement of the turbine at the input side results in a hydraulic fluid flow which causes a corresponding movement of the hydraulic impeller connected to the input shaft of the transmission. While torque converters provide a smooth coupling between the engine and the transmission, the slippage of the torque converter results in a parasitic loss, thereby decreasing the efficiency of the powertrain. Further, the shift operation in an automatic transmission requires a hydraulic pump which pressurizes a fluid for clutch engagement. The power required to pressurize the fluid introduces additional parasitic losses of efficiency in the powertrain. In addition, other parasitic losses associated with automatic transmissions exist.

Before a shift between the gear ratios of a manual transmission can occur, it is necessary to synchronize the rotational speed of the driveshaft with the rotational speed of the driven shaft. Typically, synchronization is obtained in a manual transmission by way of a synchronizing mechanism such as a mechanical synchronizer which is well known in the art. The mechanical synchronizer varies the speed of the driveshaft to match the speed of the driven shaft to enable smooth engagement of the selected gear set. For example, during an upshift, the mechanical synchronizer utilizes frictional forces to decrease the rate of rotation of the driveshaft so that the desired gear of the driveshaft is engaged smoothly to drive the desired gear of the driven shaft. Conversely, during a downshift, the mechanical synchronizer increases the rate of rotation of the driveshaft so that the desired gear is engaged smoothly to drive the desired gear on the driven shaft. Typically, with a manual transmission, there is a delay period between disengagement of the currently engaged gear and the subsequent synchronization and engagement of the desired transmission gear. Also, during this process, the clutch connection between the engine output shaft and the transmission input shaft needs to be disengaged prior to the gear shifting process and re-engaged upon synchronization.

Thus, it is an object of the present invention to provide an electro-mechanical automatic transmission which utilizes the manual-type transmission design in order to eliminate the parasitic losses associated with the torque converter and the hydraulic controls of conventional automatic transmissions. The electro-mechanical automatic transmission of the present invention is essentially an automated manual transmission. The design utilizes a dual clutch/dual input shaft layout. The layout is the equivalent of having two transmissions in one housing. Each transmission can be shifted and clutched independently. Uninterrupted power upshifting and downshifting between gears is available along with the high mechanical efficiency of a manual transmission being available in an automatic transmission. Significant increases in fuel economy and vehicle performance are achieved. The present invention is directed to an electro-mechanical automatic transmission for use with a front wheel drive vehicle. A similar design for a rear wheel drive vehicle is disclosed in commonly assigned U.S. Pat. No. 5,966,989 which is herein incorporated by reference.

According to the present invention, an electro-mechanical automatic transmission is provided including a first input shaft and a second input shaft concentric with the first input shaft. A plurality of drive gears are rotatably mounted to the first input shaft. An idler gear is provided in meshing engagement with an input gear on said second input shaft. The idler gear drives a lay shaft which is also provided with a plurality of drive gears rotatably mounted thereon. The first input shaft and the lay shaft are provided with synchronizer devices for selectively engaging the drive gears thereto. A driven shaft is provided with a plurality of driven gears in meshing engagement with the drive gears. The electro-mechanical automatic transmission is provided with a pair of electro-mechanical clutch actuators for selectively disengaging dual clutches which transmit engine torque to the input shafts, as well as an electro-mechanical shift actuator system which operatively engage the synchronizer devices for selectively engaging the drive gears.

The dual clutch system of the present invention includes two dry discs driven by a common flywheel assembly. Two electro-mechanical clutch actuators are provided to control disengagement of the two-clutch discs independently. Shifts are accomplished by engaging the desired gear prior to a shift event and subsequently engaging the corresponding clutch.

The transmission of the present invention can be in two different gear ratios at once, but only one clutch will be engaged and transmitting power. To shift to the new gear ratio, the driving clutch will be released and the released clutch will be engaged. The two-clutch actuators perform a quick and smooth shift as directed by an on-board vehicle control system using closed-loop control reading engine RPMs or torque. The transmission shaft that is disengaged will then be shifted into the next gear ratio in anticipation of the next shift.

A hill holder mechanism is provided in the form of an engagable overruning one-way roller clutch. This clutch will be engaged when the transmission is in first, second, or third gears in order to prevent vehicle rollback on a hill. A series of four synchronizer pairs are preferably used on one of the input shafts and a lay shaft. The hill holder mechanism is selectively engaged by one of the synchronizers. The hill holder prevents rollback of the vehicle when it is stopped. Contrary to an automatic transmission, there is no engine torque required to hold the vehicle from rolling back on a grade, thus efficiency is improved.

The transmission of the present invention includes drive gears on a first and a second shaft in meshing engagement with common driven gears on the output shaft. The ability to utilize a single driven gear to mate with two different drive gears on the first and second shafts allow for the reduction of the number of gears and a reduction in size of the transmission. The shortened length of the transmission permits the transmission to be utilized in a transaxle powertrain.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
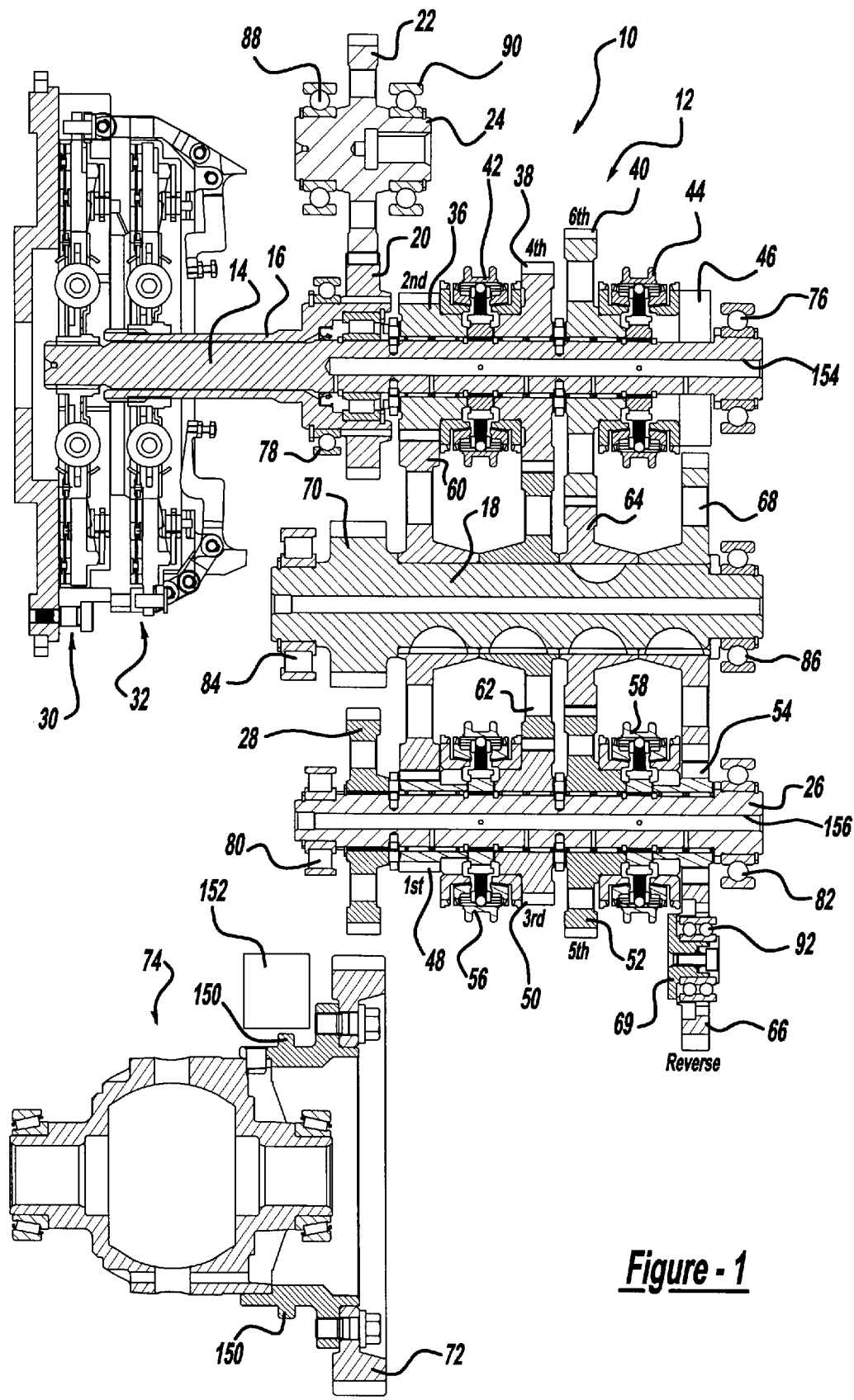
FIG. 1 is a sectional view of the electro-mechanical automatic transmission according to the principles of the present invention.

With reference to the accompanying drawings, the electro-mechanical automatic transmission 10, according to the principles of the present invention, will now be described. The electro-mechanical automatic transmission 10 is provided with a gear train 12 which includes a first input shaft 14 and a second hollow input shaft 16 which is concentric with the first input shaft 14.

The first input shaft 14 supports a plurality of rotatably mounted drive gears which are engaged with respective driven gears mounted to a driven shaft 18. The second input shaft supports a drive gear 20 which is meshingly engaged with an idler gear 22 supported on an idler shaft 24. A lay shaft 26 is provided with an input gear 28 which meshingly engages the idler gear 22. A plurality of rotatably mounted drive gears are supported by the lay shaft 26. A first friction clutch 30 is provided for transmitting torque from the engine output shaft (not shown) to the first input shaft 14. A second friction clutch 32 is provided for transmitting drive torque from the engine output shaft to the second input shaft 16. A dual cam assembly, along with first and second clutch actuators are provided for selectively disengaging the first and second friction clutches 30, 32. Commonly assigned U.S. Pat. No. 5,966,989 discloses an exemplary dual cam assembly 24 and clutch actuator system which can be utilized for selectively disengaging the first and second friction clutches 30, 32, as is fully described in the referenced U.S. Pat. No. 5,966,989 which is herein incorporated by reference herein.

The gear train 12 includes second 36, fourth 38, and sixth 40 speed gears which are rotatably mounted to the first input shaft 14. A second-fourth synchronizer device 42 is provided for selectively engaging the second and fourth speed gears 36, 38, respectively to the first input shaft 14. A sixth speed/hill holder synchronizer device 44 is provided for selectively engaging the sixth speed gear 40 to the first input shaft 14. In addition, the sixth speed/hill holder synchronizer 44 engages an overrunning one-way clutch (hill holder) device 46 for preventing the vehicle from rolling backward down a hill. The function of the hill holder device is described in detail in the aforementioned U.S. Pat. No. 5,966,989.

First 48, third 50, fifth 52, and reverse 54 speed gears are rotatably mounted to the lay shaft 26. A first-third synchronizer device 56 is provided for selectively engaging the first and third speed gears 48, 50, respectively, to the lay shaft 26. A fifth/reverse synchronizer device 58 is provided for selectively engaging the fifth speed gear 52 and the reverse gear 54 to the lay shaft 26.

The output shaft 18 is provided with a first driven gear 60 which is meshingly engaged with both the first speed gear 48 and the second speed gear 36. The driven shaft 18 is provided with a second driven gear 62 which is meshingly engaged with the third speed gear 50 and fourth speed gear 48. The output shaft 18 includes a third driven gear 64 which is meshingly engaged with the fifth speed gear 52 and the sixth speed gear 40. A reverse idler gear 66 is provided in meshing engagement with the reverse gear 54 and also meshingly engages a reverse driven gear 68 mounted to the output shaft 18. The reverse idler gear 66 also drives a low pressure lubrication pump 69. The lay shaft 26 is closer to the output shaft 18 than the first input shaft 14. Thus, the first, third, and fifth drive gears 48, 50, 52 are smaller than the second, fourth, and sixth gears 36, 38, 40, respectively. The output shaft 18 is provided with an output gear 70 which meshingly engages with a ring gear 72 of a front differential assembly 74. The front differential assembly 74 is provided with left and right drive axles (not shown) as is well known in the art.

The first input shaft 14 is supported by a bearing assembly 76. The second input shaft 16 is supported by a bearing assembly 78. The lay shaft 26 is supported by first and second bearing assemblies 80, 82. The output shaft 18 is supported by first and second bearing assemblies 84, 86. The idler shaft 24 is supported by first and second bearing assemblies 88, 90. The reverse idler gear 66 is supported by bearing assembly 92.

Figure 2:
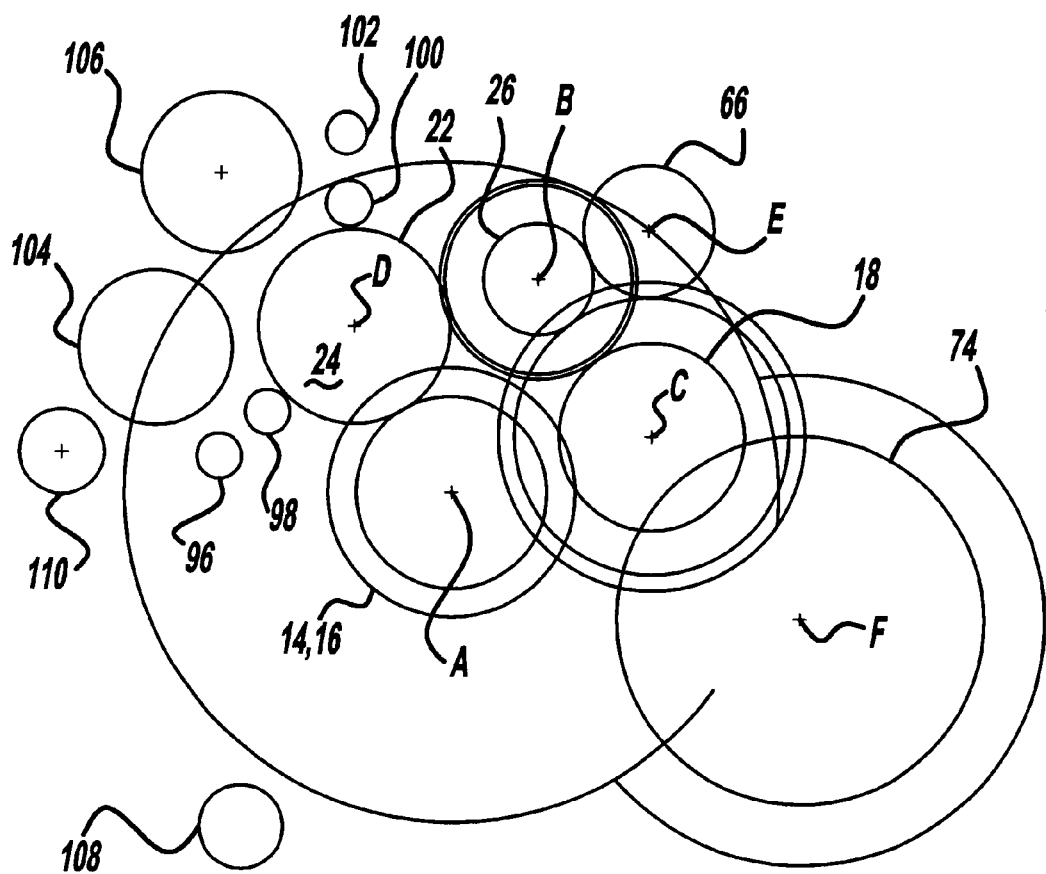
FIG. 2 illustrates the layout of the various shafts of the electro-mechanical automatic transmission for a front wheel drive vehicle according to the principles of the present invention.

FIG. 2 shows a schematic view of the layout of the electro-mechanical automatic transmission for use in a front wheel drive vehicle according to the principles of the present invention. The first and second input shafts 14, 16 rotate about the axis A. The lay shaft 26 rotates about axis B. The output shaft 18 rotates about axis C. The idler shaft 24 rotates about the axis D. The reverse idler gear 66 rotates about the axis E. The front differential assembly 74 rotates about the axis F. The shift rails 96, 98 for the first and second synchronizers 42, 44 and the shift rails 100, 102 for the synchronizer devices 56, 58 are also shown. The shift motors 104, 106 associated with the shift rails 96–102 are also shown. First and second clutch motors 108, 110 are also included.

Figure 3:
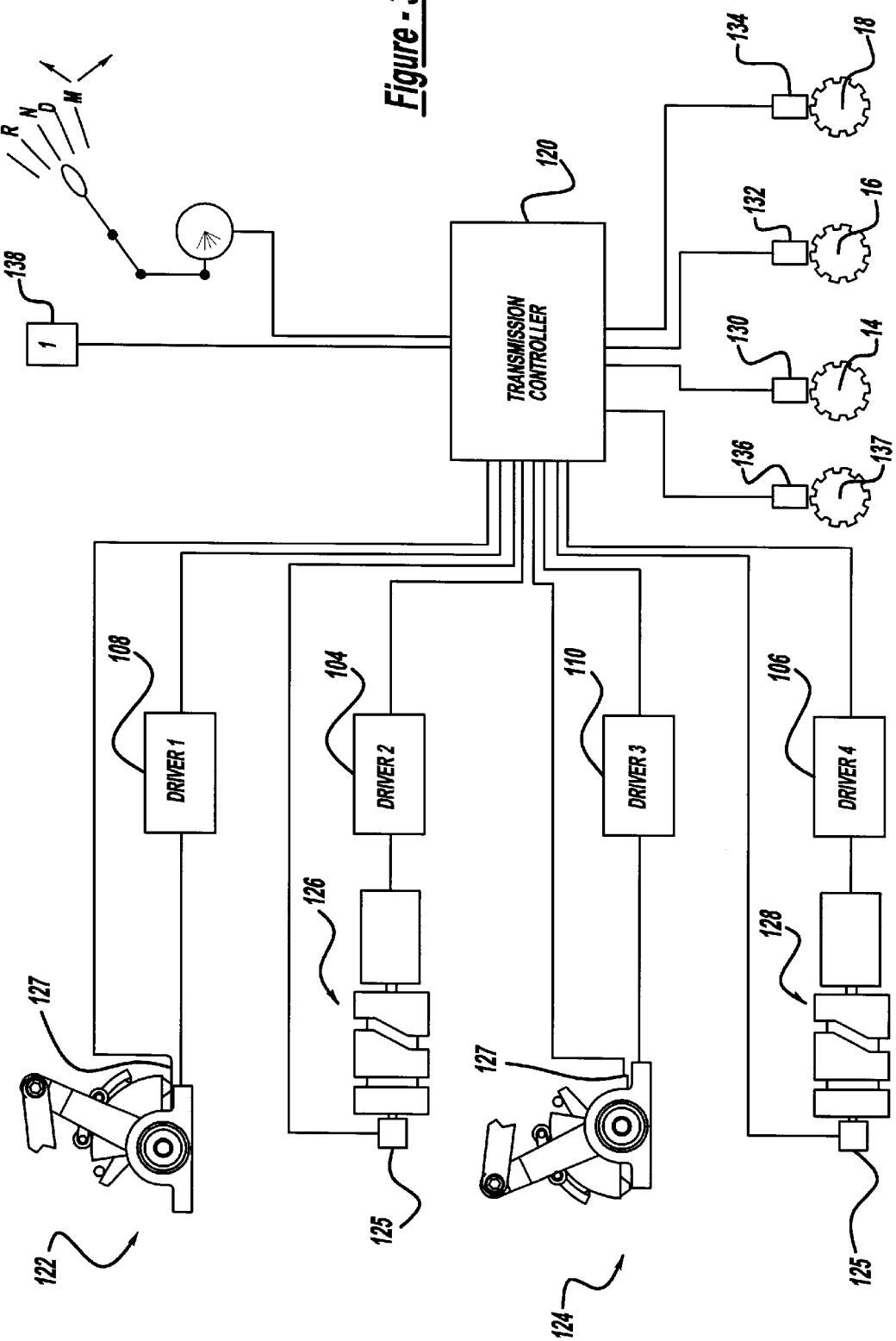
FIG. 3 is a schematic illustration of the control system for the electro-mechanical automatic transmission according to the principles of the present invention.

As mentioned above, the first and second clutches 30, 32 as well as the clutch actuators (not shown) are fully described in commonly assigned U.S. Pat. No. 5,966,989. In addition, the shift rails for engaging the synchronizers 42, 44, 56 and 58 are also disclosed in U.S. Pat. No. 5,966,989. With reference to FIG. 3, a transmission controller 120 is provided for operating the clutch actuators 122, 124 and the shift actuators 126, 128. The transmission controller 120 provides signals to the driver motors 108, 110 of the clutch actuators 122, 124 as well as to the driver motors 104, 106 of the shift actuators 126, 128. The transmission controller 120 also monitors the position of the clutch actuators 122, 124 as well as the shift actuators 126, 128 via potentiometers 125, 127, respectively. Uninterrupted power shifting between gears is accomplished by engaging the next desired gear prior to a shift event. The transmission 10 of the present invention can be in two different gear ratios at once, with only one clutch 30, 32 being engaged for transmitting power.

In order to shift to a new gear ratio, the current driving clutch will be released via the corresponding clutch actuator, and the released clutch will be engaged via the corresponding clutch actuator. The two clutch actuators perform a quick and smooth shift as directed by the transmission controller 120 which monitors the speed of the input shafts 14, 16 via speed sensors 130, 132, respectively, as well as the speed of the output shaft 18 as detected by a speed sensor 134. Alternatively, the controller 120 can determine the speed of the input shafts 14, 16 based upon the known gear ratio and the speed of the output shaft 18 as detected by sensor 134. An engine speed sensor 136 is also provided and detects the speed of the engine flywheel 137. Based upon the accelerator pedal position as detected by a sensor 138, the vehicle speed, and the current gear ratio, the transmission controller 120 anticipates the next gear ratio of the next shift and drives the shift actuators 126, 128, accordingly, in order to engage the next gear ratio while the corresponding clutch actuator is in the disengaged position. As a gear is engaged, the corresponding input shaft or lay shaft which is disengaged from the engine output shaft, becomes synchronized with the rotational speed of the output shaft 18. At this time, the clutch which is associated with the current driving input shaft is disengaged and the other clutch is engaged in order to drive the input shaft associated with the selected gear.

The hill holder mechanism 46 is selectively engaged when the transmission is in first, second, or third gears in order to prevent vehicle rollback on a hill when a vehicle is at rest. Accordingly, the transmission controller 120 determines when the vehicle operating parameters are such that the hill holder features is desirable.

The housing of the front differential 74 is provided with a plurality of projections 150 which are selectively engaged by a brake mechanism 152 which is actuated by the controller 120 to provide a parking brake feature. A similar brake mechanism 152 is disclosed in U.S. Pat. No. 5,966,989.

Lubricating oil is provided to each of the drive gears via passages 154, 156 provided in the first input shaft 14 and the lay shaft 26.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for use with a vehicle, comprising:

a first input shaft having a plurality of drive gears rotatably mounted thereon for selective engagement with said first input shaft;

a second input shaft concentric with said first input shaft and having a drive gear mounted thereon;

an idler gear in meshing engagement with said drive gear on said second input shaft;

a lay shaft having an input gear in meshing engagement with said idler gear and a plurality of drive gears rotatably mounted thereon for selective engagement with said lay shaft;

a driven shaft parallel to said first input shaft and said lay shaft and including a plurality of driven gears fixedly mounted to said driven shaft in meshing engagement with corresponding ones of said drive gears mounted to said first input shaft and said lay shaft; and at least one synchronizer device mounted on each of said first input shaft and said lay shaft for selectively engaging selected ones of said drive gears to said first input shaft and said lay shaft for transmitting drive torque to one of said driven gears mounted on said driven shaft;

wherein said drive gears include a reverse gear and first through sixth speed gears, one of said first input shaft and said lay shaft including first, third and fifth speed gears which are selectively engaged thereto by a pair of synchronizer devices the other of said first input shaft and said lay shaft including second, fourth and sixth speed gears which are selectively engaged thereto by a pair of synchronizer devices.

2. The transmission according to claim 1, wherein said reverse gear is provided on one of said first input shaft and said lay shaft and is selectively engaged by one of said synchronizer devices.

3. A transmission for use with a vehicle, comprising:

a first input shaft having a plurality of drive gears rotatably mounted thereon for selective engagement with said first input shaft;

a second input shaft concentric with said first input shaft and having a drive gear mounted thereon;

an idler gear in meshing engagement with said drive gear on said second input shaft;

a lay shaft having an input gear in meshing engagement with said idler gear and a plurality of drive gears rotatably mounted thereon for selective engagement with said lay shaft;

a driven shaft parallel to said first input shaft and said lay shaft and including a plurality of driven gears fixedly mounted to said driven shaft in meshing engagement with corresponding ones of said drive gears mounted to said first input shaft and said lay shaft; and a hill holder device including an overrunning one-way clutch mechanism mounted on one of said first input shaft and said lay shaft and engagable by a synchronizer device.

4. A transmission for use with a vehicle, comprising:

a first shaft having a plurality of drive gears rotatably mounted thereon for selective engagement with said first shaft;

a second shaft having a plurality of drive gears rotatably mounted thereon for selective engagement with said second shaft;

a driven shaft in parallel to said first shaft and said second shaft and including a plurality of driven gears fixedly mounted to said driven shaft in meshing engagement with at least one of said drive gears mounted to said first shaft and at least one of said drive gears mounted to said second shaft; and at least one synchronizer device mounted on each of said first shaft and said second shaft for selectively engaging selected ones of said drive gears to said first shaft and said second shaft for transmitting drive torque to one of said driven gears mounted on said driven shaft;

wherein said drive gears include a reverse gear and first through sixth speed gears, one of said first shaft and said second shaft including first, third and fifth speed gears which are selectively engaged thereto by a pair of synchronizer devices the other of said first shaft and said second shaft including second, fourth and sixth speed gears which are selectively engaged thereto by a pair of synchronizer devices.

5. The transmission according to claim 4, wherein said reverse gear is provided on one of said first shaft and said second shaft and is selectively engaged by one of said synchronizer devices.

6. A transmission for use with a vehicle, comprising:

a first shaft having a plurality of drive gears rotatably mounted thereon for selective engagement with said first shaft;

a second shaft having a plurality of drive gears rotatably mounted thereon for selective engagement with said second shaft;

a driven shaft in parallel to said first shaft and said second shaft and including a plurality of driven gears fixedly mounted to said driven shaft in meshing engagement with at least one of said drive gears mounted to said first shaft and at least one of said drive gears mounted to said second shaft; and a hill holder device including an overrunning one-way clutch mechanism mounted on one of said first shaft and said second shaft and engagable by a synchronizer device.

* * * * *